United States Patent
Klinefelter et al.

(10) Patent No.: US 8,423,906 B2
(45) Date of Patent: Apr. 16, 2013

(54) CROSS-COMPONENT BUS CHANNEL COMMUNICATION AND SELECTION

(75) Inventors: Phillip Klinefelter, Collinsville, IL (US); Jason Lee, O'Fallon, IL (US)

(73) Assignee: Lockheed Martin Corporation, Bethesda, MD (US)

(*) Notice: Subject to any disclaimer, the term of this patent is extended or adjusted under 35 U.S.C. 154(b) by 277 days.

(21) Appl. No.: 12/868,270

(22) Filed: Aug. 25, 2010

(65) Prior Publication Data

US 2012/0054676 A1    Mar. 1, 2012

(51) Int. Cl.
*G06F 3/00* (2006.01)
*G06F 13/00* (2006.01)

(52) U.S. Cl.
USPC ............................ 715/810; 715/765; 710/38

(58) Field of Classification Search ............... 715/763, 715/764, 765, 810, 835; 710/10, 12, 14, 710/33, 38, 104, 107
See application file for complete search history.

(56) References Cited

U.S. PATENT DOCUMENTS

| | | | |
|---|---|---|---|
| 6,032,205 A * | 2/2000 | Ogimoto et al. | 710/33 |
| 6,772,335 B2 * | 8/2004 | Curtis et al. | 713/163 |
| 6,918,000 B2 * | 7/2005 | Zolnowsky | 710/313 |
| 7,558,721 B2 | 7/2009 | Szpak et al. | |
| 7,559,032 B2 | 7/2009 | King et al. | |
| 2002/0156757 A1 | 10/2002 | Brown | |
| 2007/0136693 A1 * | 6/2007 | Lilleness et al. | 715/835 |
| 2008/0172632 A1 | 7/2008 | Stambaugh | |
| 2008/0222599 A1 | 9/2008 | Nathan et al. | |
| 2008/0235656 A1 | 9/2008 | Hui et al. | |
| 2008/0295164 A1 | 11/2008 | Steiner et al. | |
| 2008/0301643 A1 | 12/2008 | Appleton et al. | |
| 2009/0125977 A1 | 5/2009 | Chander et al. | |
| 2009/0150902 A1 | 6/2009 | Gisolfi | |
| 2009/0193148 A1 | 7/2009 | Jung et al. | |
| 2009/0210481 A1 | 8/2009 | Fletcher et al. | |
| 2009/0259631 A1 | 10/2009 | Farrell et al. | |
| 2010/0122193 A1 * | 5/2010 | Lange et al. | 715/765 |

FOREIGN PATENT DOCUMENTS

CN    101488151 A    7/2009

* cited by examiner

*Primary Examiner* — Xiomar L Bautista
(74) *Attorney, Agent, or Firm* — Ronald E. Prass, Jr.; Prass LLP (57) ABSTRACT

A method, an application component manager, and a set of instructions are disclosed. A user interface 150 may register a first user component selection and a first user channel selection. A processor 110 may assign a first transmitting application component 220 to transparently broadcast a first transmission on a first bus channel 210 based on the first user component selection and the first user channel selection.

18 Claims, 7 Drawing Sheets

CROSS-COMPONENT BUS CHANNEL COMMUNICATION AND SELECTION

BACKGROUND

1. Field of the Invention

The present invention relates to a method and system for managing the interaction of application components. The present invention further relates to assigning broadcast bus channels to application components.

2. Introduction

An application component, also referred to as an applet or a widget, is a single task application that may be integrated with a graphical user interface. For example, an application component may perform stock tracking, receive weather updates, track a specific cargo, display a clock, or other data tasks. These application components may share data with other application components. Currently, data sharing between application components is pre-set within the graphical user interface.

SUMMARY OF THE INVENTION

A method, an application component manager, and a set of instructions are disclosed. A user interface may register a first user component selection and a first user channel selection. A processor may assign a first transmitting application component to transparently broadcast a first transmission on a first bus channel based on the first user component selection and the first user channel selection.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for managing application components.

A method, an application component manager, and a set of instructions are disclosed. A user interface may register a first user component selection and a first user channel selection. A processor may assign a first transmitting application component to transparently broadcast a first transmission on a first bus channel based on the first user component selection and the first user channel selection.

A set of application components may be interconnected, referred to as a mashup, to provide a richer presentation of a data set. A user may use a graphical user interface (GUI) to assign a bus channel to a transmitting application component. The transmitting application component may transparently broadcast data in a transmission on the bus channel. Any application components assigned to that bus channel may receive that transmission and use that data to perform the function of the application component. A bus channel hub may manage and control the bus channels of the network of application components.

Figure 1:
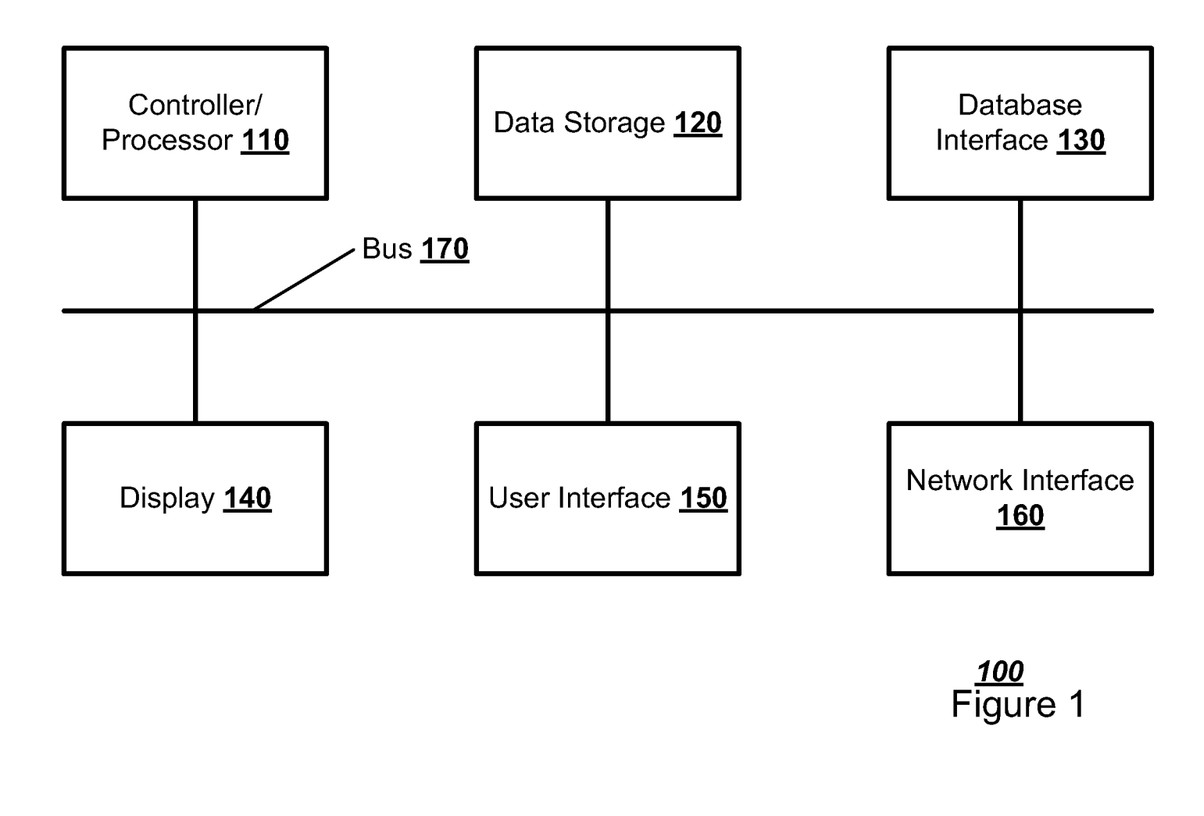
FIG. 1 illustrates, in a block diagram, one embodiment of a computing device.

FIG. 1 illustrates a possible configuration of a computing system 100 to act as an application component manager. The computing system 100 may include a controller/processor 110, a memory 120, a database interface 130, a display 140, a user interface 150, and a network interface 160, connected through bus 170. The network server 100 may implement any operating system. Client and server software may be written in any programming language, such as C, C++, Java or Visual Basic, for example. The server software may run on an application framework, such as, for example, a Java® server or .NET® framework The controller/processor 110 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 120 may include volatile and nonvolatile data storage, including one or more electrical, magnetic or optical memories such as a random access memory (RAM), cache, hard drive, or other memory device. The memory may have a cache to speed access to specific data. The memory 120 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 130 may be used by the controller/processor 110 to access the database. The display 140 may be a device that presents a visual representation or a graphical user interface (GUI) to the user.

The user interface 150 may be connected to one or more input devices that may include a keyboard, mouse, pen-operated touch screen or monitor, voice-recognition device, or any other device that accepts input. The user interface 150 may also be connected to one or more output devices, such as a monitor, printer, disk drive, speakers, or any other device provided to output data. The user interface 150 may receive a data task or connection criteria from a network administrator.

The network connection interface 160 may be connected to a communication device, modem, network interface card, a transceiver, or any other device capable of transmitting and receiving signals from the network. The network connection interface 160 may be used to connect a client device to a network. The components of the network server 100 may be connected via an electrical bus 170, for example, or linked wirelessly.

Client software and databases may be accessed by the controller/processor 110 from memory 120, and may include, for example, database applications, word processing applications, as well as components that embody the disclosed functionality of the present invention. The network server 100 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 2:
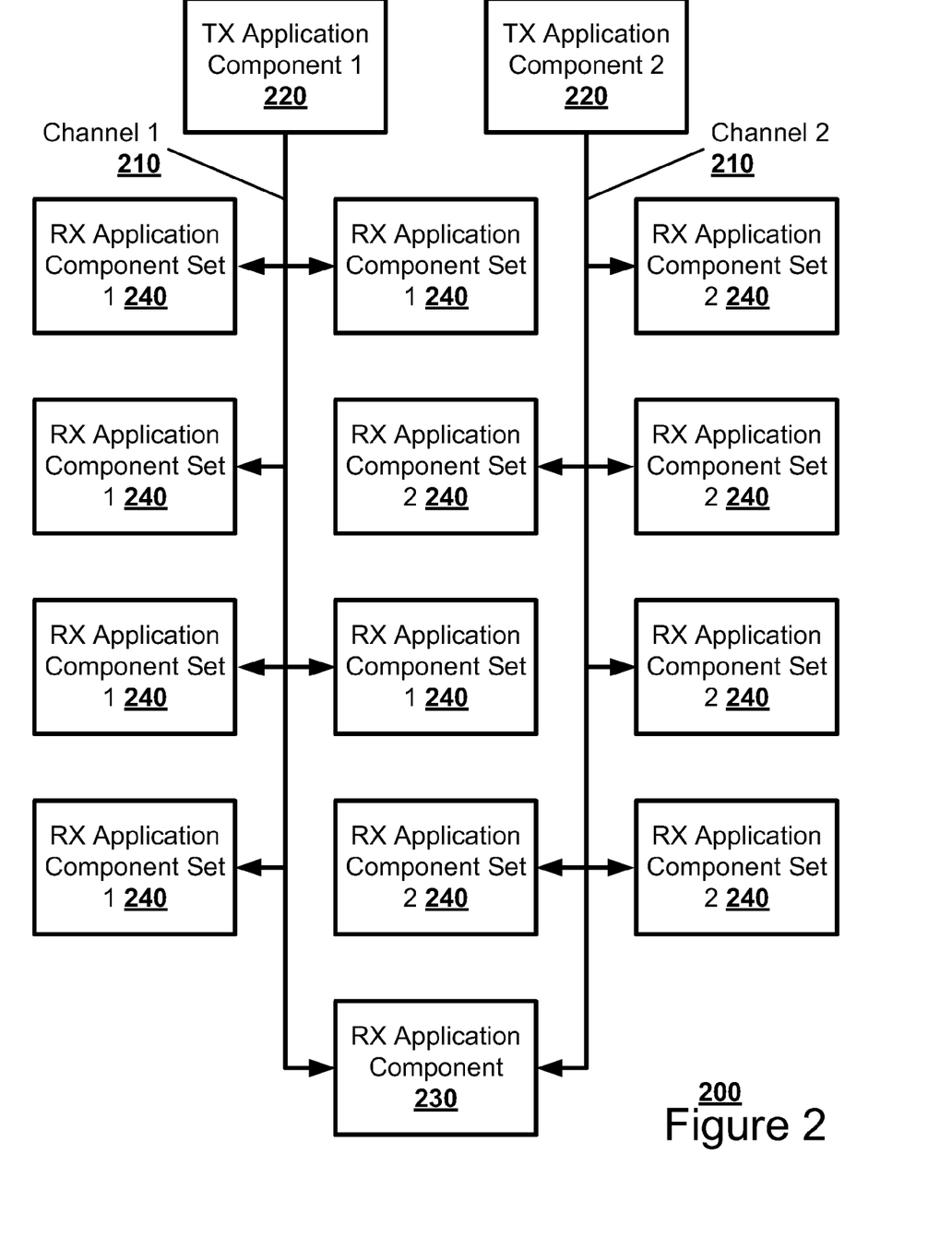
FIG. 2 illustrates, in a block diagram, one embodiment of an application component network.

FIG. 2 illustrates, in a block diagram, one embodiment of an application component network 200. The application component network 200 may have series of application components connected by one or more bus channels 210. The bus channels 210 may be virtual bus channels implemented by software or physical bus channels implemented by hardware. The application components may have a small task set focused on the collection or display of a specific type of data. A transmitting (TX) application component 220 may generate or aggregate a set of data to be broadcast as a transmission, for reception by a receiving (RX) application component 230. The RX application component 230 may incorporate the data received in the broadcast transmission in performing its own functions. An application component may act as a TX application component 220 and a RX application component 230 at any time. A TX application component 220 may act as a RX application component 230 and vice versa. A broadcast transmission is not assigned to a specific RX application component 230, but is rather sent on a specific bus channel 210 assigned to the TX application component 220.

For example, a first TX application component 220 may broadcast a first transmission on a first bus channel 210 to a first RX application component set 240. Additionally, a second TX application component may broadcast a second transmission on a second bus channel 210 to a second RX application component set 240. The first RX application component set and the second RX application component set represent any RX application components receiving transmissions broadcast on a bus channel, and thus may have multiple RX application components 230, one RX application components 230, or even no RX application components. Additionally, an RX application component 230 may be a member of the first RX application component set 240, receiving the first transmission on the first bus channel 210, and a member of the second RX application component set 240, receiving the second transmission transparently broadcast from a second transmitting application component on the second bus channel 210. The RX application component 230 may aggregate the data from the first transmission and the second transmission to perform its own function.

Figure 3A:
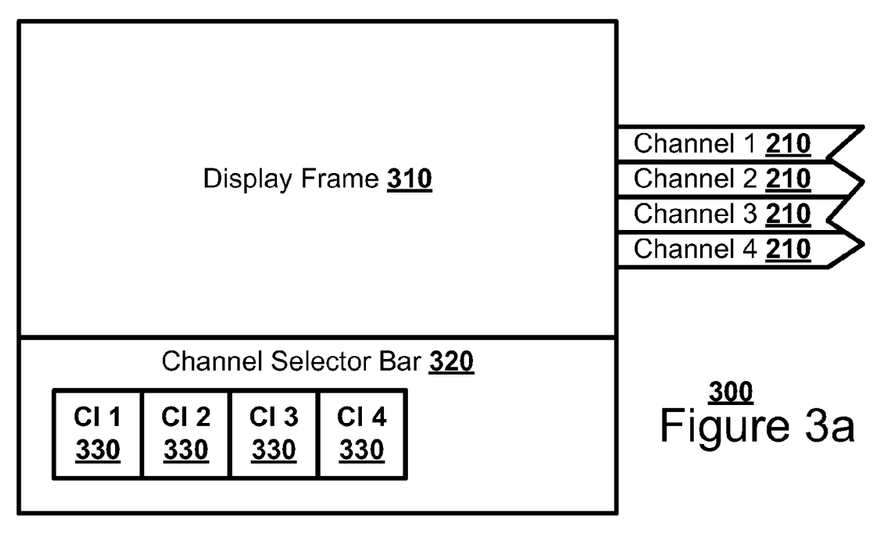
FIGS. 3a-b illustrate, in block diagrams, two embodiments of graphical user interfaces for application components.

The application component may have a GUI that allows a user to transparently select which bus channel the application component uses to transmit or receive broadcast transmissions. FIG. 3a illustrates, in block diagrams, one embodiment of a GUI 300 for an application component. The application component may be represented by a display frame 310 displaying any data managed, collected, or generated by the application component. The display frame 310 may have a bus channel selection bar 320 appended to the display frame 310. The bus channel selection bar 320 may present a set of bus channel icons (CIs) 330. Each bus channel icon 330 may represent a different bus channel 210. A user may select a CI 330 to indicate an application component is a user component selection and that the associated bus channel is a user bus channel selection. For example, the display 140 may display a first CI 330 representing the first bus channel 210 on a first display frame 310 representing the first TX application component 220 and a second CI 330 representing the second bus channel 210 on a second display frame 310 representing the second TX application component 220. The user may select the first CI 330 to indicate a first user component selection and a first user bus channel selection. The user may then select the second CI 330 to indicate a second user component selection and a second user bus channel selection.

Figure 3B:
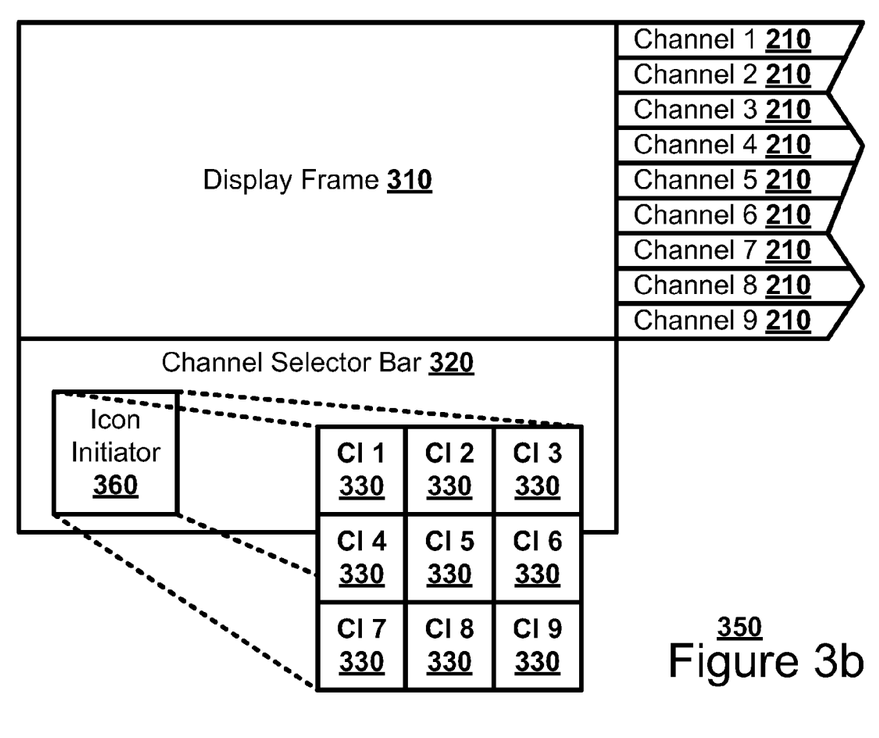

FIG. 3b illustrates, in block diagrams, one embodiment of an alternate GUI 350 for an application component. The bus channel selector bar 320 may have a hidden set of CIs 330 that are presented to the user upon activation of an icon initiator 360. A user may activate the icon initiator 360 by clicking it or by passing a cursor over the icon initiator 360. The set of CIs 330 may be arranged into a two dimensional spatial configuration. The set of CIs 330 may be color coded, either to differentiate between the different CIs 330 or to indicate selection of a CI 330. The set of CIs 330 may include, for example, the first CI 330 and the second CI 330.

Figure 4:
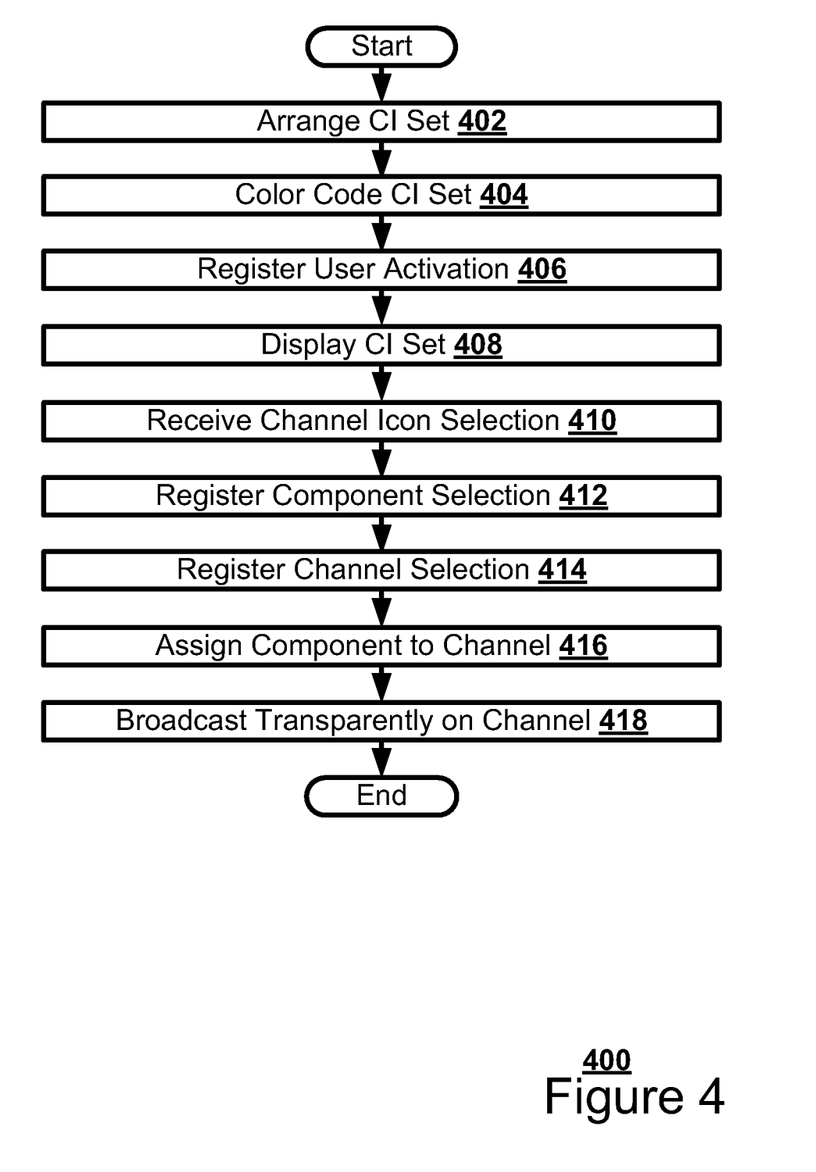
FIG. 4 illustrates, in a flowchart, one method of assigning a bus channel to an application component.

FIG. 4 illustrates, in a flowchart, one method 400 of assigning a bus channel to an application component. A processor 110 may arrange a set of CIs 330 into a two dimensional spatial configuration (Block 402). The processor 110 may color code the set of CIs 330 (Block 404). The input/output device interface 150 may register a user activation of the icon initiator 360 (Block 406). The display 140 may display the set of CIs 330 representing the bus channels on the display frame 310 representing the transmitting application component 220 to the user (Block 408). The input/output device interface 150 may receive a bus channel icon selection from the user (Block 410). The processor 110 may register a user component selection based upon selection of the bus channel icon by a user (Block 412). The processor 110 may register a user bus channel selection upon selection of the bus channel icon by a user (Block 414). The processor 110 may assign the bus channel 210 to the TX application component 220 based on the user component selection and the user bus channel selection (Block 416). The TX application component 220 may transparently broadcast a transmission on the bus channel 210 (Block 418).

Figure 5:
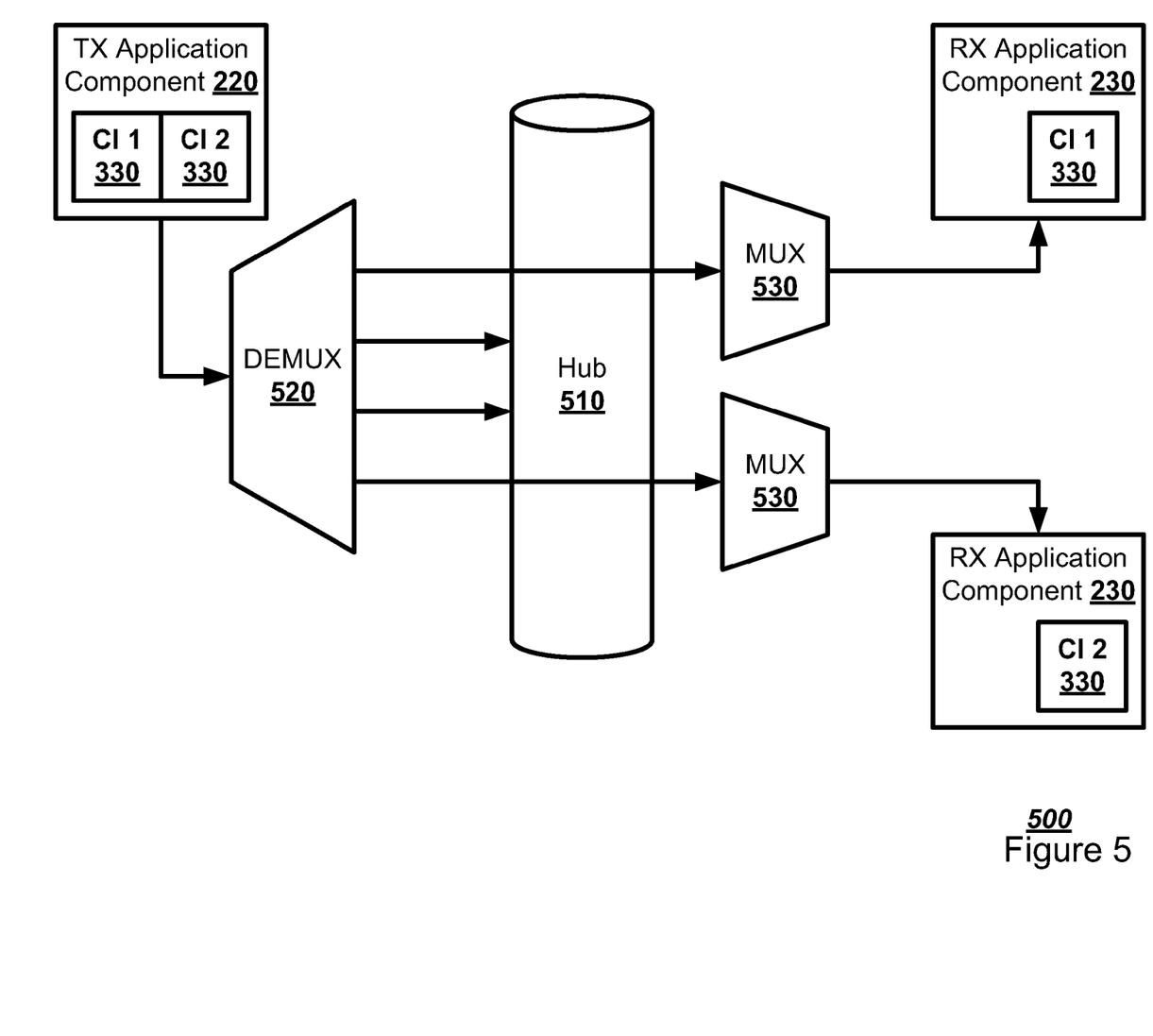
FIG. 5 illustrates, in a block diagram, one embodiment of an application component manager using a bus channel hub.

A computer 100 may use a bus channel hub to manage the bus channels 210. FIG. 5 illustrates, in a block diagram, one embodiment of an application component manager 500 using a bus channel hub 510. The bus channel hub 510 may be software, firmware, or hardware. A TX application component 220 may be assigned a set of one or more bus channels by the user. The TX application component 220 may transparently broadcast a transmission on the selected bus channels 210. A demultiplexer (DEMUX) 520 may duplicate the transmissions and prefix the selected bus channels 210. The bus channel hub 510 may create the illusion of multiple hubs. A multiplexer (MUX) 530 may remove the prefixed bus channel for the selected bus channel 210. The RX application component 220 may receive the transmission for the bus channel 210 assigned to that RX application component 220 by the user.

For example, the TX application component 220 may be a stock tracker assigned the first bus channel 210 and the second bus channel 210 by the user. A first RX application component 230 may be a graphing display assigned the first bus channel 210 and a second RX application component 230 may be a news ticker assigned the second bus channel 210. The stock tracker 220 may broadcast the stock price and the stock name. The DEMUX 520 may duplicate the stock price and the stock name to be sent on the first bus channel 210 and the second bus channel 210. A first MUX 530 may remove the stock name from the first bus channel 210. A second MUX 530 may remove the stock price from the second bus channel 210. The graphing display 230 may present a graph of the stock price. The news ticker 230 may present any news related to the stock name.

Figure 6:
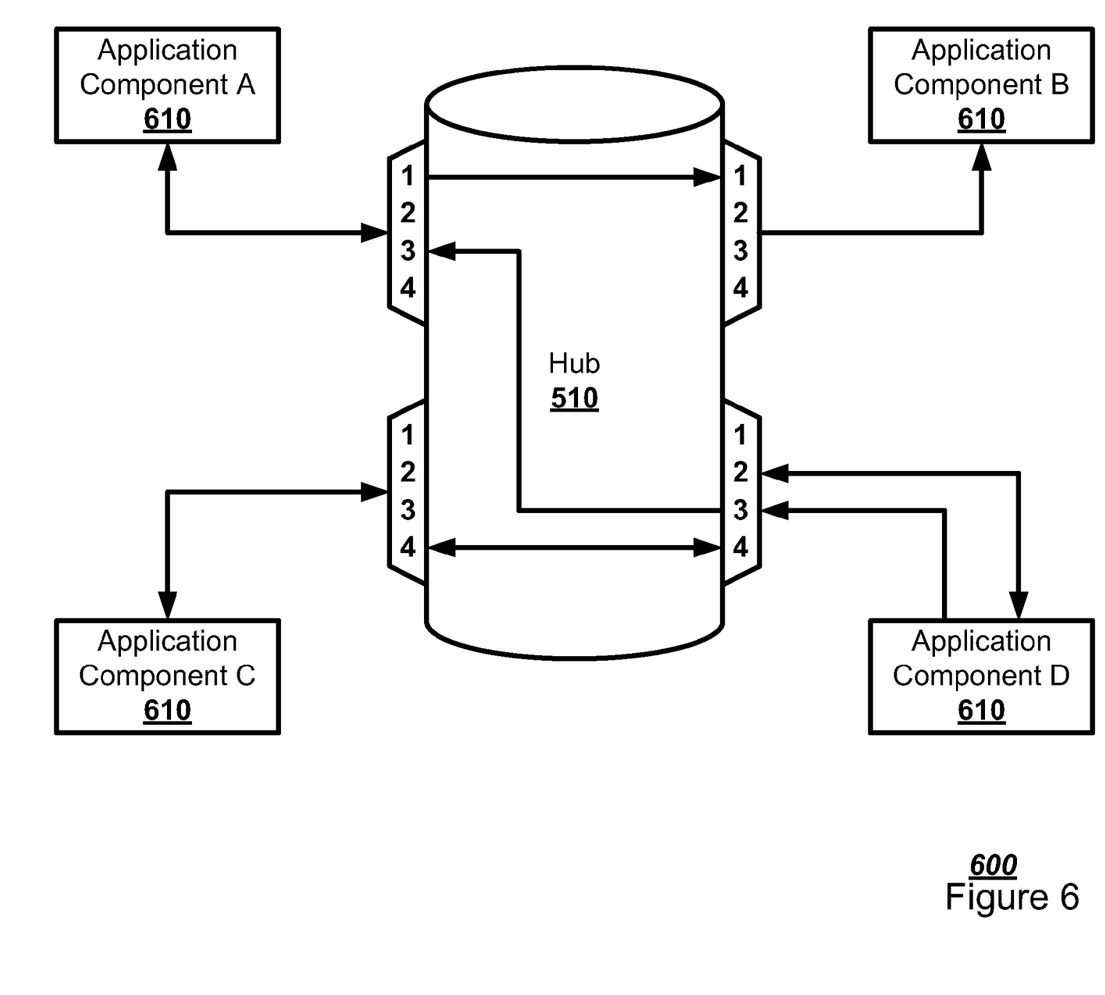
FIG. 6 illustrates, in a block diagram, one embodiment of a bus channel hub control system.

FIG. 6 illustrates, in a block diagram, one embodiment of a bus channel hub control system 600. The bus channel hub 510 may connect multiple application components 610 that may act as either a TX application component 220 or a RX application component 230. The bus channel hub 510 may transmit a control message between a first bus channel 210 and a second bus channel 210. The control message may be used for managing and controlling various bus channels 210. The bus channel hub 510 may translate any transmissions for broadcast. Additionally, any transmission sent by a first application component 610 on a first bus channel 210 may be hidden from a second application component 610 on a second bus channel 210.

For example, application component A 610 may publish and subscribe to message X. Application component B 610 may subscribe to message X. Application component C 610 may publish and subscribe to message Y. Application component D 610 may publish to message X and publish and subscribe to message Y. Application component A 610 may send message X on bus channel 1 210 to application component B 610. Application component C 610 may exchange message Y on bus channel 4 210 with application component D 610. Application component D 610 may send message X on bus channel 1 210 to application component A 610. The message X sent by application component D 610 may be hidden from application component B 610.

Figure 7:
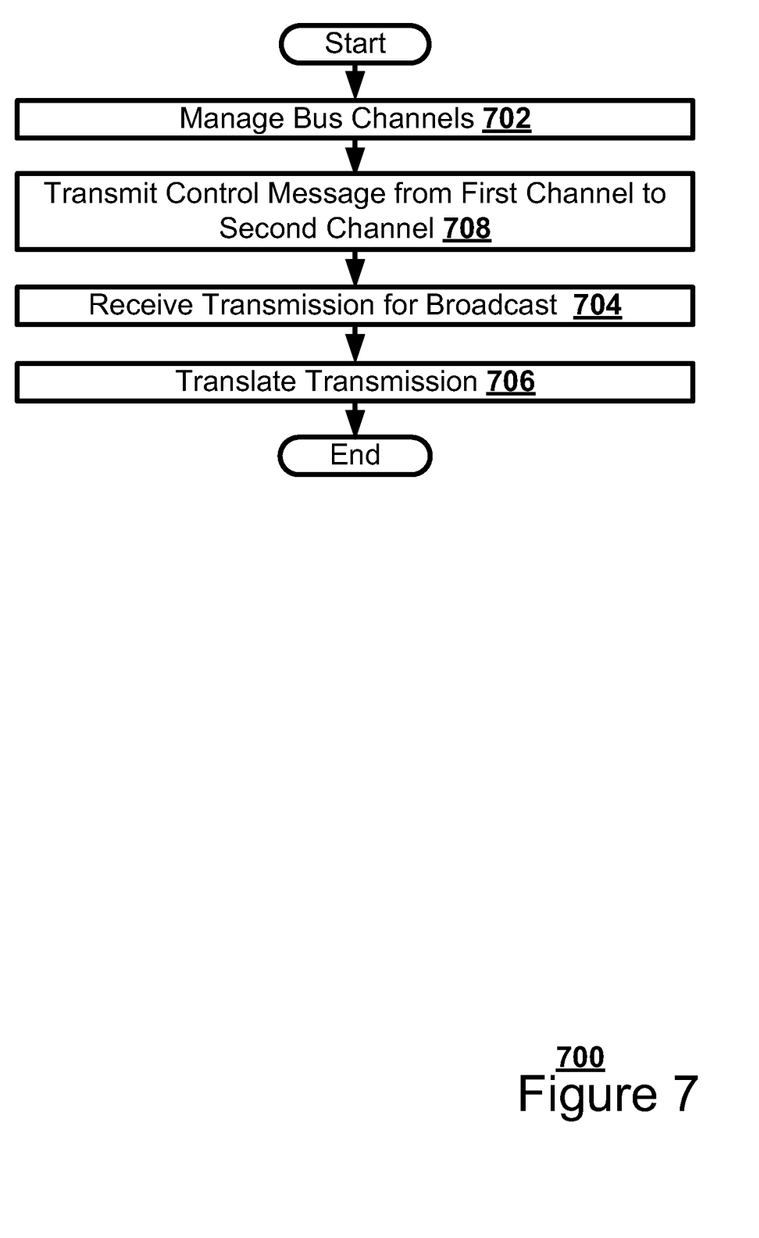
FIG. 7 illustrates, in a flowchart, one embodiment of a method for managing bus channels with a bus channel hub.

FIG. 7 illustrates, in a flowchart, one embodiment of a method 700 for managing bus channels with a bus channel hub 510. The bus channel hub 510 may manage the bus channels 210 for an application component manager 500 (Block 702). The bus channel hub 510 may transmit a control message from a first bus channel 210 to a second bus channel 210 (Block 704). The bus channel hub 510 may receive a transmission for broadcast from a TX application component 220 on the first bus channel 210 (Block 706). The bus channel hub 510 may translate the transmission for broadcast into a format readable by a RX application component 230 on the first bus channel 210 (Block 708)

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for communicating a set of interconnected application components associated with an application, comprising:

registering, with a processor, a first user application component selection from the set of interconnected application components;

associating, with the processor, a first bus channel from a set of bus channels with the first user application component selection;

registering, with the processor, at least one second user application component selection from the set of interconnected application components;

associating, with the processor, separate second bus channels from the set of bus channels with each of the at least one second user application component selection; and transmitting application data with a transmitting component by transparently broadcasting the first user application component selection with the first bus channel and the at least one second user application component selection with the associated separate second bus channel.

2. The method of claim 1, wherein a plurality of receiving components receive the transmitted application data, a first of the plurality of receiving components receiving the first user application component selection on the first bus channel, the first bus channel being associated with the first of the plurality of receiving components, and at least a second of the plurality of receiving components receiving the at least one second user application selection on the associated separate second bus channel, the associated separate second bus channel being associated with the at least the second of the plurality of receiving components.

3. The method of claim 1, further comprising managing at least the first bus channel with a bus channel hub.

4. The method of claim 1, further comprising translating the transmitted data for broadcast using a bus channel hub.

5. The method of claim 1, further comprising:
displaying channel icons representing selectable channels of the set of bus channels on a display device associated with the transmitting component,
at least the associating the first bus channel from the set of bus channels with the first user application component selection comprising selecting a first channel icon of the displayed channel icons by a user.

6. The method of claim 5, further comprising arranging the displayed channel icons into a two dimensional spatial configuration.

7. The method of claim 6, further comprising color coding the displayed channel icons.

8. An application component manager, comprising:
a processor;
a user interface that communicates with the processor to (1) register first user application component selection from a set of interconnected application components, (2) associate a first bus channel from a set of bus channels with the first user application component selection, (3) register at least one second user application component selection from the set of interconnected application components and (4) associate separate second bus channels from the set of bus channels with each of the at least one second user second user application component selection; and
a transmitter that transparently broadcasts data including the first user application component selection with the first user bus channel and the at least one second user application component selection with the associated separate second bus channel.

9. The application component manager of claim 8, wherein a first of a plurality of receiving components receives the first user application component selection on the first bus channel and at least a second of the plurality of receiving components receives the at least one second user application component selection on the associated separate second bus channel.

10. The application component manager of claim 8, further comprising a hardware bus channel hub to manage at least the first bus channel.

11. The application component manager of claim 10, wherein the hardware bus channel hub translates the data for broadcast by the transmitter.

12. The application component manager of claim 8, the user interface including a display that presents channel icons representing selectable bus channels to allow a user to select at least the first bus channel channel by selecting one of the channel icons.

13. The application component manager of claim 12, the channel icons being arranged for display into a two dimensional spatial configuration.

14. The application component manager of claim 13, wherein the display color codes the channel icons.

15. A non-transitory machine-readable medium having a set of instructions detailing a method for communicating a set of interconnected application components associated with an application stored thereon that, when executed by one or more processors, cause the one or more processors to perform the method, comprising:
registering a first user application component selection from the set of interconnected application components;
associating a first bus channel from a set of bus channels with the first user application component selection;
registering at least one second user application component selection from the set of interconnected application components;
associating separate second bus channels from the set of bus channels with each of the at least one second user application component selection;
transmitting application data with a transmitting component by transparently broadcasting the first user application component selection with the first bus channel and the at least one second user application component selection with the associated separate second bus channel; and
managing at least the first bus channel with a software bus channel hub.

16. The non-transitory machine-readable medium of claim 15, wherein a plurality of receiving components receive the transmitted application data, a first of the plurality of receiving components receiving the first user application component selection on the first bus channel, the first bus channel being associated with the first of the plurality of receiving components, and at least a second of the plurality of receiving components receiving the at least one second user application selection on the associated separate second bus channel, the associated separate second bus channel being associated with the at least the second of the plurality of receiving components.

17. The non-transitory machine-readable medium of claim 15, further comprising:
displaying channel icons representing selectable channels of the set of bus channels on a display device associated with the transmitting component,
at least the associating the first bus channel from the set of bus channels with the first user application component selection comprising selecting a first channel icon of the displayed channel icons by a user.

18. The non-transitory machine-readable medium of claim 17, further comprising arranging the displayed channel icons into a two dimensional spatial configuration.

* * * * *